(12) United States Patent
Sugiura

(10) Patent No.: US 9,787,679 B2
(45) Date of Patent: Oct. 10, 2017

(54) TELECONFERENCE SYSTEM AND STORAGE MEDIUM STORING PROGRAM FOR TELECONFERENCE

(71) Applicant: Brother Kogyo Kabushiki Kaisha, Nagoya-shi, Aichi-ken (JP)

(72) Inventor: Masatoshi Sugiura, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 35 days.

(21) Appl. No.: 14/865,077

(22) Filed: Sep. 25, 2015

(65) Prior Publication Data

US 2016/0094554 A1  Mar. 31, 2016

(30) Foreign Application Priority Data

Sep. 30, 2014 (JP) ................. 2014-199928

(51) Int. Cl.
*H04L 29/06* (2006.01)
*H04L 12/18* (2006.01)

(52) U.S. Cl.
CPC ...... *H04L 63/0876* (2013.01); *H04L 12/1822* (2013.01)

(58) Field of Classification Search
CPC .................. H04L 12/1822; H04L 63/0876
See application file for complete search history.

(56) References Cited

U.S. PATENT DOCUMENTS 5,867,494 A * 2/1999 Krishnaswamy ... H04L 65/4038
370/352

8,325,896 B2 * 12/2012 Alexandrov ............ H04M 3/56
379/202.01

(Continued)

FOREIGN PATENT DOCUMENTS

| CA | EP 2736240 A1 * | 5/2014 | ............ H04M 3/563 |
| JP | 3641590 B2 | 4/2005 | |

(Continued)

OTHER PUBLICATIONS

Americas Headquarters, Cisco Systems, Inc., "Cisco WebEx Meetings Server Planning Guide", pp. 1-116, Oct. 21, 2012.

*Primary Examiner* — Noura Zoubair
*Assistant Examiner* — Arezoo Sherkat
(74) *Attorney, Agent, or Firm* — Banner & Witcoff, Ltd.

(57) ABSTRACT

In a teleconference system, it is determined whether address information of a terminal apparatus operated by a conference participant is included in a particular range. When the address information of the terminal apparatus is within the particular range, first authentication information corresponding to the conference participant is transmitted from a first communicator of the security server to an authentication server. The first authentication information is acquired from the terminal apparatus through the first communicator. The authentication server authenticates usage of a function through a network corresponding to the particular range. When the address information of the terminal apparatus is outside the particular range, second authentication information corresponding to the conference participant is transmitted from the first communicator to the conference management server. The second authentication information is acquired from the terminal apparatus through the first communicator. The conference management server authenticates connection to a conference server that controls the teleconference.

11 Claims, 6 Drawing Sheets

(56) References Cited

U.S. PATENT DOCUMENTS

| | | | |
|---|---|---|---|
| 8,713,148 B2* | 4/2014 | Imai | H04L 12/1822 709/223 |
| 8,856,917 B2* | 10/2014 | Das | H04L 63/0838 713/151 |
| 9,361,080 B2* | 6/2016 | Das | G06F 15/16 |
| 2002/0026590 A1 | 2/2002 | Kusunoki | |
| 2003/0163733 A1 | 8/2003 | Barriga-Caceres et al. | |
| 2004/0003046 A1* | 1/2004 | Grabelsky | H04L 29/06 709/206 |
| 2005/0154913 A1 | 7/2005 | Barriga et al. | |
| 2007/0184819 A1 | 8/2007 | Barriga-Caceres et al. | |
| 2014/0189012 A1* | 7/2014 | Nishida | H04L 65/403 709/204 |
| 2014/0267569 A1* | 9/2014 | Periyannan | H04L 65/605 348/14.08 |
| 2014/0280535 A1* | 9/2014 | Owens | H04L 67/14 709/204 |

FOREIGN PATENT DOCUMENTS

| | | | |
|---|---|---|---|
| JP | 4579546 B2 | 11/2010 | |
| JP | 5463757 B2 | 4/2014 | |

\* cited by examiner

FIG. 2

| No. | SSO TOKEN | FAMILY NAME | FIRST NAME | USAGE FUNCTION INFORMATION | SESSION INFORMATION |
|---|---|---|---|---|---|
| 1 | X1X1X1 | AAA | Aaa | ENTIRE USAGE PERMISSION | |
| 2 | Y2Y2Y2 | BBB | Bbb | PARTIAL USAGE PERMISSION | |

| No. | SSO TOKEN | FAMILY NAME | FIRST NAME | USAGE FUNCTION INFORMATION | SESSION INFORMATION |
|---|---|---|---|---|---|
| 1 | X1X1X1 | AAA | Aaa | ENTIRE USAGE PERMISSION | xxx111 |
| 2 | Y2Y2Y2 | BBB | Bbb | PARTIAL USAGE PERMISSION | yyy222 |

FIG. 3

| No. | CONFERENCE LOGIN ID | CONFERENCE PASSWORD | FAMILY NAME | FIRST NAME | USAGE FUNCTION INFORMATION | SESSION INFORMATION |
|---|---|---|---|---|---|---|
| 1 | ZZZ | 3333 | CCC | Ccc | LIMITED PERMISSION | |

| No. | CONFERENCE LOGIN ID | CONFERENCE PASSWORD | FAMILY NAME | FIRST NAME | USAGE FUNCTION INFORMATION | SESSION INFORMATION |
|---|---|---|---|---|---|---|
| 1 | ZZZ | 3333 | CCC | Ccc | LIMITED PERMISSION | zzz333 |

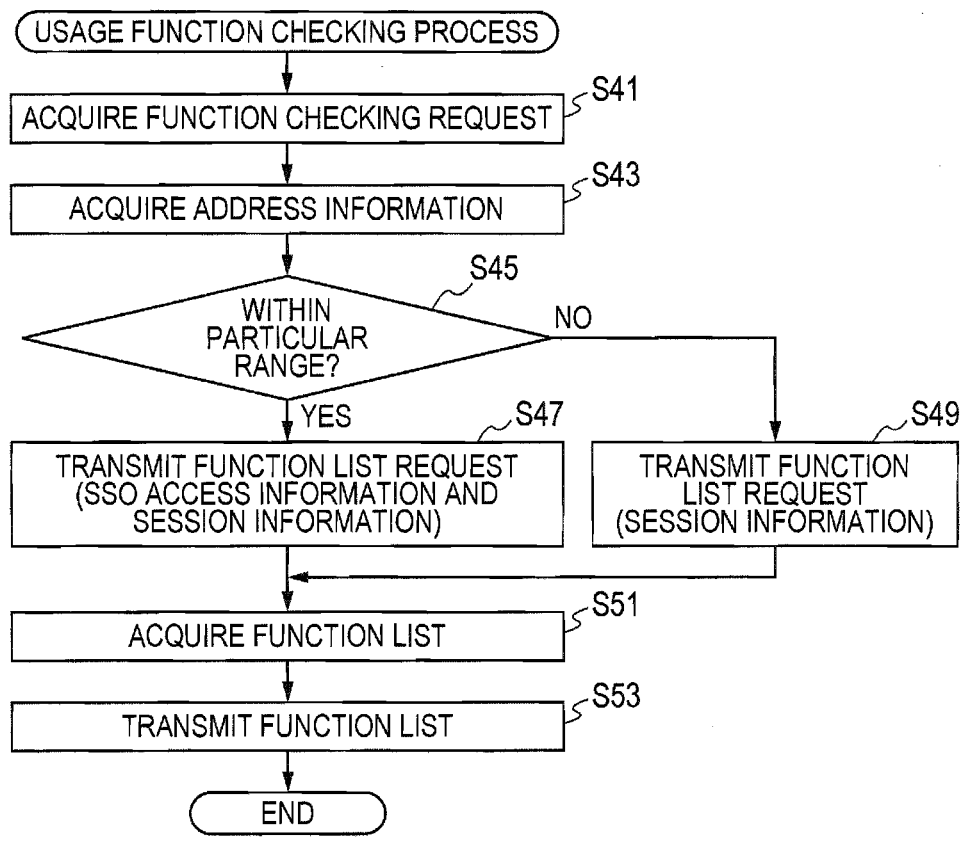

TELECONFERENCE SYSTEM AND
STORAGE MEDIUM STORING PROGRAM
FOR TELECONFERENCE

CROSS REFERENCE TO RELATED
APPLICATIONS

This application claims priority from Japanese Patent Application No. 2014-199928 filed Sep. 30, 2014. The entire content of the priority application is incorporated herein by reference.

TECHNICAL FIELD

This disclosure relates to a teleconference system in which a teleconference is conducted through a network, a storage medium storing a program executed when a teleconference is conducted, and a security server and a conference management server included in the teleconference system.

BACKGROUND

Technology for teleconference through a network is proposed. For example, a Web conference system is disclosed. The Web conference system includes a Web conference server, an LDAP server, and a plurality of client terminals. The Web conference server performs communication with the LDAP server and the plurality of client terminals through a local area network. The Web conference server manages a user management table. The LDAP server is a server that provides a directory service for connecting by an LDAP protocol. The LDAP server manages personal information in a centralized manner. In the Web conference system, authentication for general users is performed by using user information managed by the LDAP server. Authentication for guest users is performed by using user information managed by the Web conference system.

SUMMARY

According to one aspect, this specification discloses a teleconference system. The teleconference system includes a security server and a conference management server and is configured to perform a teleconference through a network. The security server includes a first communicator configured to connect to the network, a first hardware processor, and a first memory storing instructions. When executed by the first hardware processor, the instructions cause the first hardware processor to perform: a determining operation of determining whether address information of a terminal apparatus operated by a conference participant is included in a particular range; a first transmitting operation of: when the address information of the terminal apparatus is included in the particular range, transmitting first authentication information corresponding to the conference participant from the first communicator to an authentication server, the first authentication information being acquired from the terminal apparatus through the first communicator, the authentication server being configured to authenticate usage of a function through a network corresponding to the particular range; and when the address information of the terminal apparatus is outside the particular range, transmitting second authentication information corresponding to the conference participant from the first communicator to the conference management server, the second authentication information being acquired from the terminal apparatus through the first communicator, the conference management server being configured to authenticate connection to a conference server configured to control the teleconference; a second transmitting operation of, when an authentication result satisfying an authentication condition is acquired through the first communicator from the authentication server in response to transmission of the first authentication information, transmitting third authentication information from the first communicator to the conference management server, the third authentication information corresponding to the first authentication information and being generated by the security server; and a third transmitting operation of: transmitting a second authentication result from the first communicator to the terminal apparatus that is a transmission source of the second authentication information, the second authentication result being acquired from the conference management server through the first communicator in response to transmission of the second authentication information; and transmitting a first authentication result from the first communicator to the terminal apparatus that is a transmission source of the first authentication information, the first authentication result being acquired from the conference management server through the first communicator in response to transmission of the third authentication information. The conference management server includes a second communicator configured to connect to the network, a second hardware processor, and a second memory storing instructions. When executed by the second hardware processor, the instructions cause the second hardware processor to perform: an authenticating operation of: when the second authentication information is acquired from the security server through the second communicator, authenticating connection to the conference server based on authentication information stored in a management portion of the conference management server and on the second authentication information; and when the third authentication information is acquired from the security server through the second communicator, authenticating connection to the conference server based on authentication information stored in the management portion and on the third authentication information; and a fifth transmitting operation of transmitting an authentication result by the authenticating operation from the second communicator to the security server.

According to another aspect, this specification also discloses a non-transitory computer-readable storage medium storing a program executable by a computer configured to control a security server included in a teleconference system in which a teleconference is conducted through a network. The program includes: a determining instruction of determining whether address information of a terminal apparatus operated by a conference participant is included in a particular range; a first transmitting instruction of: when the address information of the terminal apparatus is included in the particular range, transmitting first authentication information corresponding to the conference participant from a first communicator of the security server to an authentication server, the first authentication information being acquired from the terminal apparatus through the first communicator, the authentication server being configured to authenticate usage of a function through a network corresponding to the particular range; and when the address information of the terminal apparatus is outside the particular range, transmitting second authentication information corresponding to the conference participant from the first communicator to the conference management server, the second authentication information being acquired from the terminal apparatus through the first communicator, the conference management server being configured to authenticate connection to a conference server configured to control the teleconference; a second transmitting instruction of, when an authentication result satisfying an authentication condition is acquired through the first communicator from the authentication server in response to transmission of the first authentication information, transmitting third authentication information from the first communicator to the conference management server, the third authentication information corresponding to the first authentication information and being generated by the security server; and a third transmitting instruction of: transmitting a second authentication result from the first communicator to the terminal apparatus that is a transmission source of the second authentication information, the second authentication result being acquired from the conference management server through the first communicator in response to transmission of the second authentication information; and transmitting a first authentication result from the first communicator to the terminal apparatus that is a transmission source of the first authentication information, the first authentication result being acquired from the conference management server through the first communicator in response to transmission of the third authentication information.

According to still another aspect, this specification also discloses a non-transitory computer-readable storage medium storing a program executable by a computer configured to control a conference management server included in a teleconference system in which a teleconference is conducted through a network. The program includes: an authenticating instruction of: when second authentication information corresponding to a conference participant is acquired from a security server through a second communicator of the conference management server, authenticating connection to a conference server based on authentication information stored in a management portion of the conference management server and on the second authentication information, the security server being configured to communicate with a terminal apparatus operated by the conference participant, the conference server being configured to control the teleconference; and when third authentication information is acquired from the security server through the second communicator, authenticating connection to the conference server based on authentication information stored in the management portion and on the third authentication information, the third authentication information corresponding to first authentication information that is managed by an authentication server configured to authenticate usage of a function through a network of which address information is included in a particular range; and a fifth transmitting instruction of transmitting an authentication result by the authenticating instruction from the second communicator to the security server.

BRIEF DESCRIPTION OF THE DRAWINGS

Embodiments in accordance with this disclosure will be described in detail with reference to the following figures wherein:

FIG. 2 is a diagram showing an example of a first database, wherein the upper table shows a state before session information is stored, and the lower table shows a state in which the session information is stored;

FIG. 3 is a diagram showing an example of a second database, wherein the upper table shows a state before session information is stored, and the lower table shows a state in which the session information is stored;

FIG. 5 is a diagram showing an example of an authentication screen;

FIG. 6 is a flowchart showing a usage function checking process;

DETAILED DESCRIPTION

Authentication information for directory service and authentication information for teleconference can be stored in one particular server in a teleconference system. In terms of information security, it is desirable to avoid storing, in association with each other, authentication information within a limited range such as authentication information for directory service and authentication information of a service not limited to the above range such as authentication information for teleconference, in a state where the authentication information can be referred to. Thus, it is possible that a server for directory service is used as an authentication server, and the above-described authentication information for directory service is not stored in a server for teleconference. With this configuration, it is necessary to perform authentication for the authentication server by using a particular authentication protocol in a network environment where directory service can be used. Thus, when participating a teleconference from a network environment where directory service cannot be used, the inventor considered that there is a possibility that the above-described configuration cannot deal with such situation appropriately. In terms of this point, the inventor considered a new configuration relating to a teleconference.

An example of an object of one aspect of this disclosure is to provide a teleconference system, a storage medium storing a program, a security server, and a conference management server in which a conference participant can participate in a teleconference regardless of a network environment of a terminal apparatus operated by a conference participant who participates in the teleconference, while keeping security.

Some aspects of the disclosure will be described while referring to the accompanying drawings. The disclosure is not limited to configurations described below, and may adopt various configuration in the same technical idea. For example, a part of the configuration shown below may be omitted or substituted with another configuration, and so on. Further, another configuration may be included.

<Teleconference System>

Figure 1:
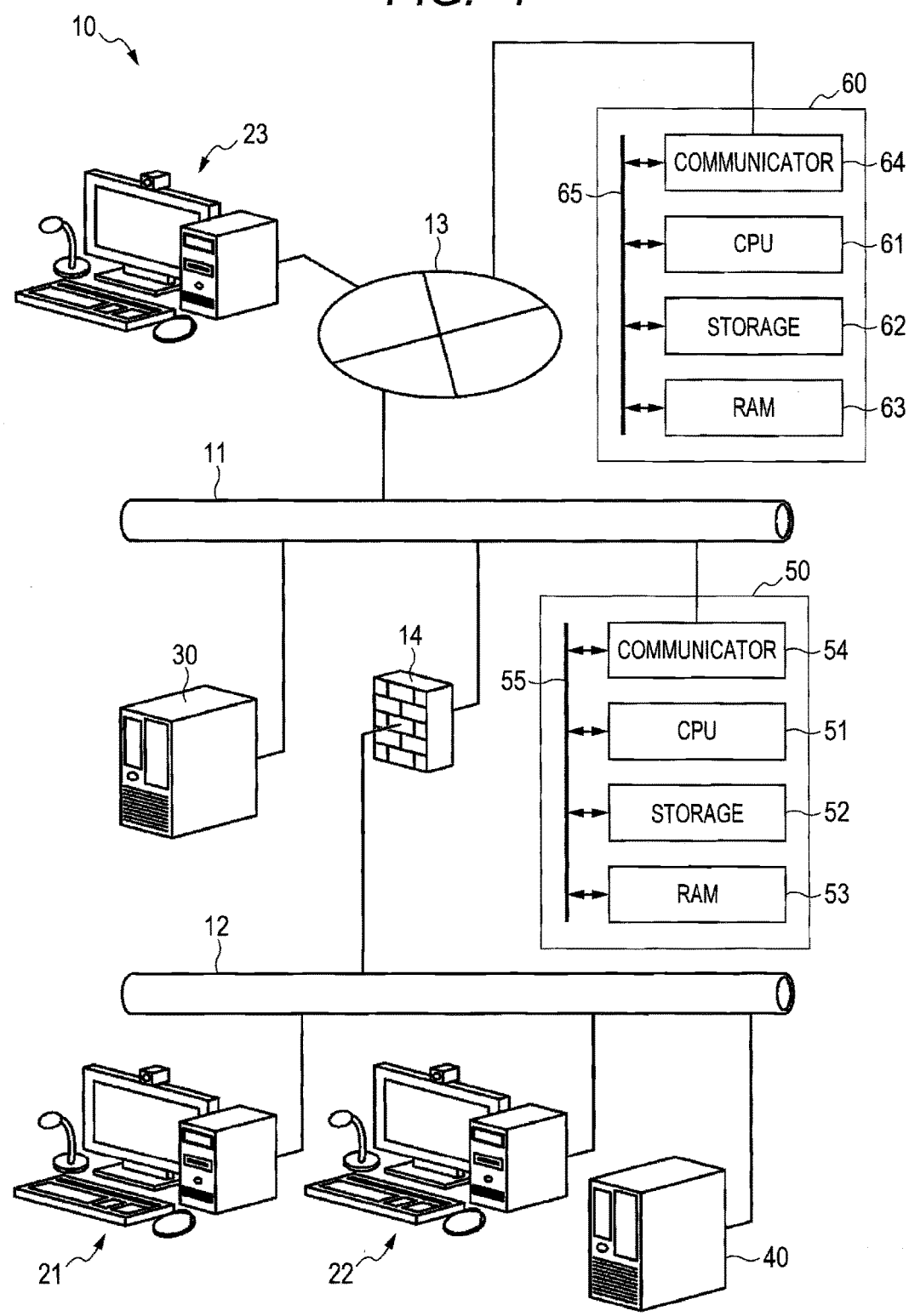
FIG. 1 is a diagram showing an example of a teleconference system.

A teleconference system 10 will be described while referring to FIG. 1. For example, the teleconference system 10 deals with a teleconference that uses one or a plurality of terminal apparatus connected to a LAN (Local Area Network) and one or a plurality of terminal apparatus connected to a WAN (Wide Area Network) or Internet. Also, the teleconference system 10 can deal with a teleconference using a plurality of terminal apparatuses connected to a LAN, or a teleconference using a plurality of terminal apparatuses connected to a WAN or Internet. When a teleconference is performed, a terminal apparatus is operated by a conference participant. In other words, a conference participant participates in a teleconference through the terminal apparatus.

In the embodiment, a teleconference performed through a first terminal apparatus 21, a second terminal apparatus 22, and a third terminal apparatus 23 is described as an example. The first terminal apparatus 21 and the second terminal apparatus 22 are connected to a LAN. The third terminal apparatus 23 is connected to an external network different from the LAN to which the first terminal apparatus 21 and the second terminal apparatus 22 are connected. The external network is a WAN or Internet. In the embodiment, the LAN is formed by connecting a first LAN 11 and a second LAN 12. The LAN formed by the first LAN 11 and the second LAN 12 is, for example, an in-house LAN in a company. The external network is referred to as "external network 13". The first LAN 11 is directly connected to the external network 13. The second LAN 12 is connected to the first LAN 11 through a firewall 14. The second LAN 12 is one of subnets where one LAN is divided and managed. The first terminal apparatus 21 and the second terminal apparatus 22 are connected to the second LAN 12.

The first terminal apparatus 21, the second terminal apparatus 22, and the third terminal apparatus 23 are information processing apparatuses having a communication function. For example, the first terminal apparatus 21, the second terminal apparatus 22, and the third terminal apparatus 23 are personal computers or tablet devices. When a teleconference is performed, each of the first terminal apparatus 21, the second terminal apparatus 22, and the third terminal apparatus 23 executes a teleconference program for a client. The first terminal apparatus 21, the second terminal apparatus 22, and the third terminal apparatus 23 are known information processing apparatuses that are also used in a teleconference by a known teleconference system. Accordingly, descriptions for the first terminal apparatus 21, the second terminal apparatus 22, and the third terminal apparatus 23 are omitted appropriately.

The teleconference system 10 includes the first terminal apparatus 21, the second terminal apparatus 22, the third terminal apparatus 23 as well as a conference server 30, an authentication server 40, a security server 50, and a conference management server 60. The security server 50 and the conference server 30 are connected to the first LAN 11. The authentication server 40 is connected to the second LAN 12. The conference management server 60 is connected to the external network 13.

The conference server 30 relays data transmitted and received between each terminal apparatus of the first terminal apparatus 21, the second terminal apparatus 22, and the third terminal apparatus 23. The data transmitted and received between each terminal apparatus includes, for example, video data shot by each terminal apparatus and audio data collected by each terminal apparatus. For example, video data shot by the first terminal apparatus 21 is transmitted to the conference server 30. This conference server 30 transfers this video data to the second terminal apparatus 22 and the third terminal apparatus 23. In addition, the conference server 30 transmits and receives document data. Transmission and reception of document data by the conference server 30 will be described later. Data communication through the conference server 30 is also performed by a known teleconference system. Accordingly, other descriptions relating to the conference server 30 are omitted appropriately.

The authentication server 40 has an authentication function for realizing single sign-on. The first terminal apparatus 21 and the second terminal apparatus 22 authenticated by the authentication server 40 can subsequently use functions that are usable in the second LAN 12, without going through further authentication. The third terminal apparatus 23 connected to the external network 13 cannot perform single sign-on at the authentication server 40. When performing authentication relating to single sign-on, the authentication server 40 accesses a database (not shown). The database stores first authentication information described later. For example, the database is stored in a storage (not shown) provided at the authentication server 40. The storage is a hard disk and/or flash memory, for example. The storage stores various programs in addition to the database. For example, various programs include an OS (Operating System) and a program for realizing an authentication function relating to single sign-on. The database may be stored in an external storage (not shown) which the authentication server 40 can access. For example, the external storage is connected to the second LAN 12. Authentication by single sign-on is, for example, a known technology, such as an authentication process compliant with SAML (Security Assertion Markup Language). The authentication server 40 may be a known server apparatus having an authentication function for realizing single sign-on. For example, the authentication server 40 is a server that is capable of providing directory service that is compliant with LDAP (Lightweight Directory Access Protocol) and so on. Accordingly, other descriptions relating to the authentication server 40 are omitted appropriately.

The security server 50 acquires first authentication information from the first terminal apparatus 21 and the second terminal apparatus 22, and acquires second authentication information from the third terminal apparatus 23. The security server 50 generates third authentication information corresponding to the first authentication information. When the first authentication information is acquired, the security server 50 transmits the first authentication information to the authentication server 40, and transmits the third authentication information to the conference management server 60. When the second authentication information is acquired, the security server 50 transmits the second authentication information to the conference management server 60. The first authentication information is a login ID and a password corresponding to single sign-on at the authentication server 40. For example, if the authentication server 40 is a server that can provide directory service, the first authentication information is an ID and a password for logging in to the directory service. The second authentication information is a login ID and a password for connecting the third terminal apparatus 23 to the conference server 30. The conference management server 60 authenticates connection to the conference server 30 in accordance with authentication information from the security server 50. The other descriptions relating to the security server 50 and the conference management server 60 will be provided later.

In the embodiment, a login ID as the first authentication information is referred to as "SSO login ID", and a login password as the first authentication information is referred to as "SSO password". Further, a login ID as the second authentication information is referred to as "conference login ID", and a login password as the second authentication information is referred to as "conference password". The third authentication information is an access token corresponding to the SSO login ID and the SSO password. An access token as the third authentication information is referred to as "SSO token". The "SSO" is an abbreviation of "Single Sign-On".

<Security Server>

The security server 50 will be described while referring to FIG. 1. The security server 50 includes a CPU 51, a storage 52, a RAM 53, and a communicator 54. Each of these units 51 to 54 are connected to a bus 55. The CPU 51 is an example of a hardware processor. The hardware processor may be any processor excluding software. The CPU 51 executes arithmetic processes. The storage 52 includes a computer-readable storage medium. For example, the storage 52 includes a hard disk and/or flash memory. In addition, the storage 52 may include a ROM. The storage 52 stores various program. For example, the storage 52 stores an OS and various application programs. The application programs stored in the storage 52 include a program of a first login process (see FIG. 4) and a program of a usage function checking process (see FIG. 6) described later. For example, the application programs are preliminarily installed in the storage 52.

For example, the preliminary install is performed by reading a program stored in a computer-readable storage medium such as a semiconductor memory by a reader (not shown) of the security server 50. If the security server 50 includes an optical drive (not shown), for example, the preliminary install may be performed by reading the program stored in an optical medium by the optical drive. Also, the preliminary install may be performed by receiving the program stored in a computer-readable storage medium such as a hard disk of the conference management server 60 connected to the external network 13 or a server apparatus (not shown), as transmission signals, by the communicator 54. Which method is adopted is determined appropriately by considering various conditions. The computer-readable storage medium may be a non-transitory storage medium that does not include a transitory storage medium (for example, transmission signals). It is only required that a non-transitory storage medium store information, irrespective of a time period of storing the information.

The RAM 53 supplies a memory area that is used when the CPU 51 executes various programs. The RAM 53 stores, in a particular memory area, particular data and information that are used by a process when the process is executed. In the security server 50, the CPU 51 executes the OS and each program of a first login process shown in FIG. 4 and a usage function checking process shown in FIG. 6 stored in the storage 52, thereby controlling the security server 50. By this operation, in the security server 50, various functions are realized.

The communicator 54 is configured to connect the security server 50 to the first LAN 11. The communicator 54 performs, when connected to the first LAN 11, data communication with the first terminal apparatus 21 and the second terminal apparatus 22 through the first LAN 11 and the second LAN 12. For example, in the security server 50, various commands and data are transmitted to and received from the first terminal apparatus 21 and the second terminal apparatus 22 through the communicator 54. The communicator 54 performs data communication with the conference management server 60 through the first LAN 11 and the external network 13. For example, in the security server 50, various commands and data are transmitted to and received from the conference management server 60 through the communicator 54. The communicator 54 is an interface circuit that is adapted to the Ethernet (registered trademark) standard, for example. Connection to the first LAN 11 by the communicator 54 is hard-wired connection. However, connection to the first LAN 11 by the communicator 54 may be wireless connection.

Figure 4:
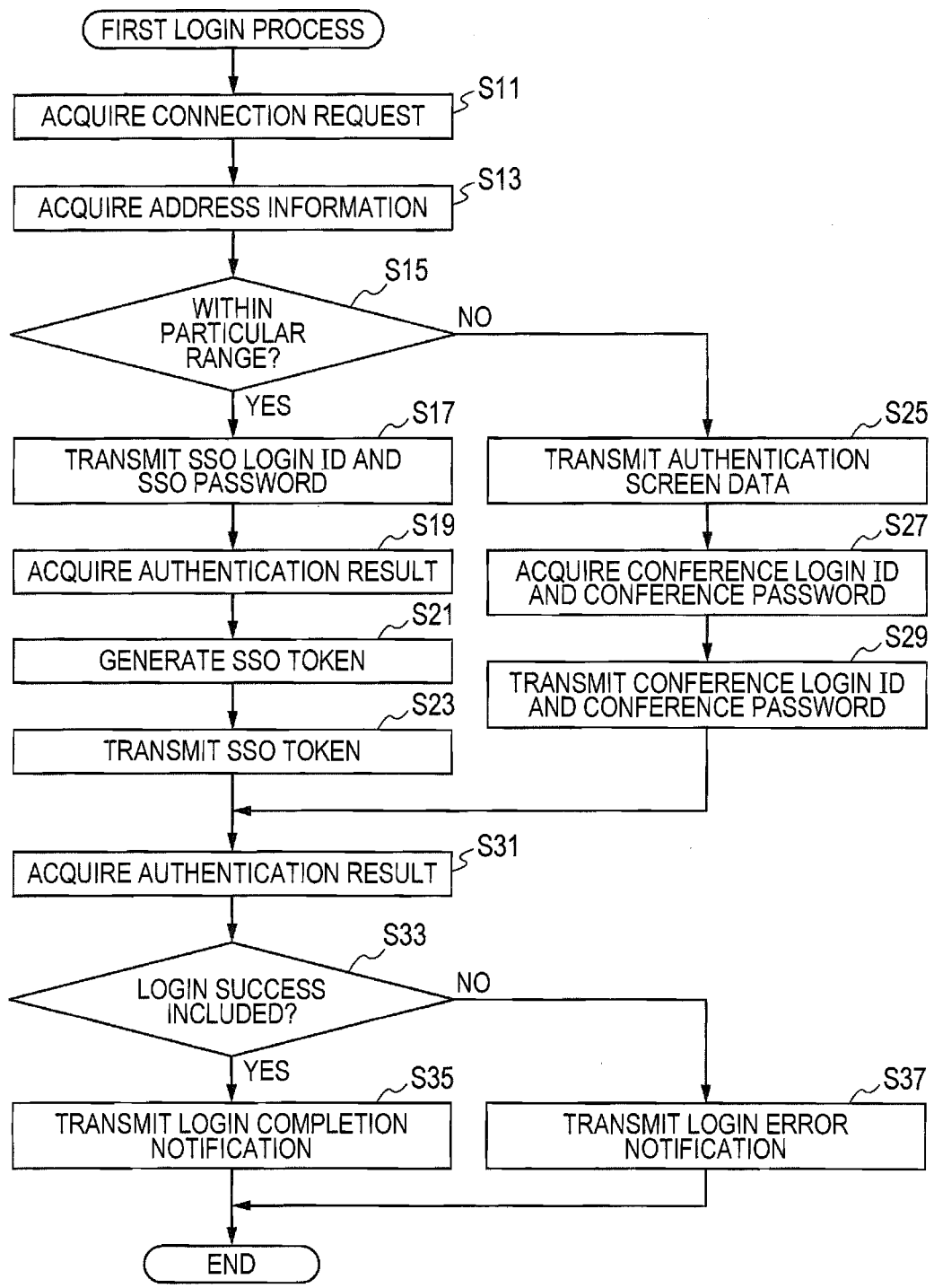
FIG. 4 is a flowchart showing a first login process.

The security server 50 is different from a known server apparatus in that the storage 52 stores each program of the first login process shown in FIG. 4 and the usage function checking process shown in FIG. 6. However, in terms of hardware, the security server 50 may be an information processing apparatus having the same communication functions as a known server apparatus. Thus, although descriptions are omitted above, the security server 50 has configurations included in a known server apparatus, in addition to the above-mentioned each unit 51 to 55.

<Conference Management Server>

The conference management server 60 will be described while referring to FIG. 1. The conference management server 60 includes a CPU 61, a storage 62, a RAM 63, and a communicator 64. Each of these units 61 to 64 are connected to a bus 65. The CPU 61 is an example of a hardware processor. The hardware processor may be any processor excluding software. The CPU 61 executes arithmetic processes. The storage 62 includes a computer-readable storage medium. For example, the storage 62 includes a hard disk and/or flash memory. In addition, the storage 62 may include a ROM. The storage 62 stores various programs. For example, the storage 62 stores an OS and various application programs. The application programs stored in the storage 62 include a program of a second login process (see FIG. 7) and a program of a function list transmitting process (see FIG. 8) described later. For example, the application programs are preliminarily installed in the storage 62.

For example, the preliminary install is performed by reading a program stored in a computer-readable storage medium such as a semiconductor memory by a reader (not shown) of the conference management server 60. If the conference management server 60 includes an optical drive (not shown), for example, the preliminary install may be performed by reading the program stored in an optical medium by the optical drive. Also, the preliminary install may be performed by receiving the program stored in a computer-readable storage medium such as a hard disk of a server apparatus (not shown) connected to the external network 13, as transmission signals, by the communicator 64. Which method is adopted is determined appropriately by considering various conditions. The computer-readable storage medium may be a non-transitory storage medium that does not include a transitory storage medium (for example, transmission signals). It is only required that a non-transitory storage medium store information, irrespective of a time period of storing the information.

The storage 62 stores a first database and a second database. The first database and the second database correspond to a management portion for authentication in the conference management server 60. As shown in FIG. 2, the first database stores SSO tokens, family names and first names of conference participants, usage function information, and session information in association with one another. The "No." is numbers for identifying respective records stored in the first database. It is assumed that an SSO token is transmitted from the security server 50 (see S23 of FIG. 4 described later). In this case, in the conference management server 60, authentication of connection to the conference server 30 is performed in accordance with the SSO token stored in the first database and the SSO token from the security server 50.

As shown in FIG. 3, the second database stores a conference login ID and a conference password, family name and first name of a conference participant, usage function information, and session information in association with one another. The "No." is numbers for identifying respective records stored in the second database. It is assumed that a conference login ID and a conference password are transmitted from the security server 50 (see S29 of FIG. 4 described later). In this case, in the conference management server 60, authentication of connection to the conference server 30 is performed in accordance with the conference login ID and the conference password stored in the second database and the conference login ID and the conference password from the security server 50. The usage function information and the session information will be described later. The first database and the second database may be stored in an external storage which the conference management server 60 can access. That is, the management portion may be is stored in the storage 62 of the conference management server 60 or in the external storage or in combination thereof.

The RAM 63 supplies a memory area that is used when the CPU 61 executes various programs. The RAM 63 stores, in a particular memory area, particular data and information that are used by a process when the process is executed. In the conference management server 60, the CPU 61 executes the OS and each program of a second login process shown in FIG. 7 and a function list transmitting process shown in FIG. 8 stored in the storage 62, thereby controlling the conference management server 60. By this operation, in the conference management server 60, various functions are realized.

The communicator 64 is configured to connect the conference management server 60 to the external network 13. The communicator 64 performs, when connected to the external network 13, data communication with the security server 50 through the external network 13 and the first LAN 11. For example, in the conference management server 60, various commands and data are transmitted to and received from the security server 50 through the communicator 64. The communicator 64 is an interface circuit that is adapted to the ETHERNE™ standard, for example. Connection to the external network 13 by the communicator 64 is wired connection. However, connection to the external network 13 by the communicator 64 may be wireless connection.

Figure 7:
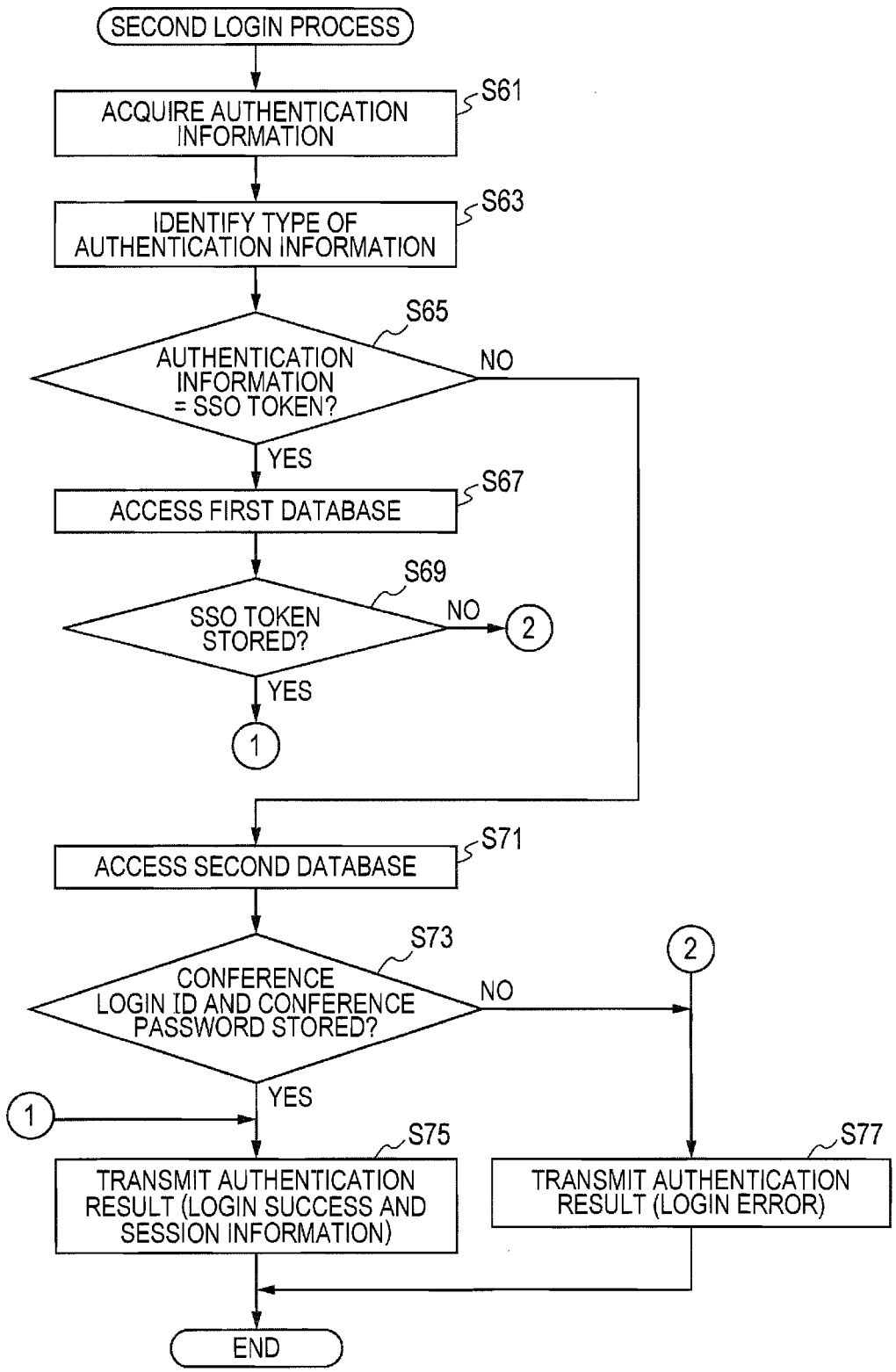
FIG. 7 is a flowchart showing a second login process.
Figure 8:
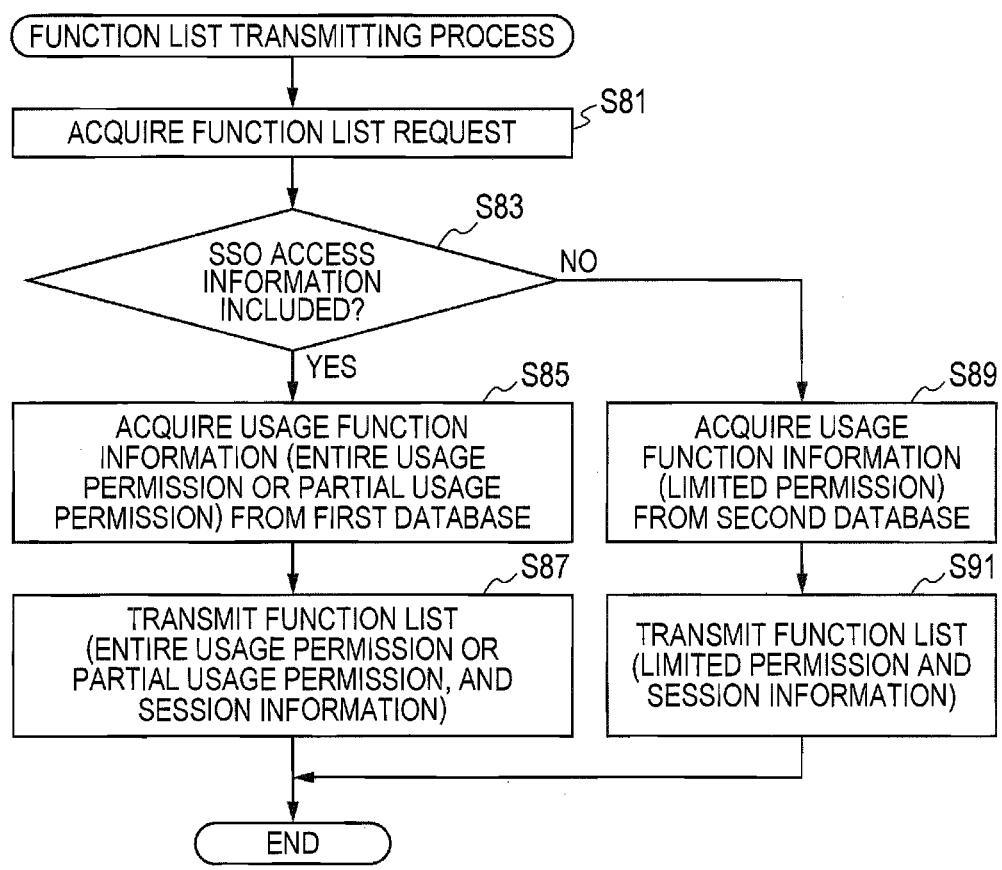
FIG. 8 is a flowchart showing a function list transmitting process.

The conference management server 60 is different from a known server apparatus in that the storage 62 stores each program of the second login process shown in FIG. 7 and the function list transmitting process shown in FIG. 8. However, in terms of hardware, the conference management server 60 may be an information processing apparatus having the same communication functions as a known server apparatus. Thus, although descriptions are omitted above, the conference management server 60 has configurations included in a known server apparatus, in addition to the above-mentioned each unit 61 to 65.

<Usage Function Information>

The usage function information will be described. In the teleconference system 10, for each conference participant, usage permission and limited permission of a conference function used in a teleconference are stored in the first database and the second database as the usage function information. In the embodiment, assume that the "No. 1" in the first database shown in FIG. 2 is a record corresponding to a conference participant who operates the first terminal apparatus 21. The "No. 2" in the first database shown in FIG. 2 is a record corresponding to a conference participant who operates the second terminal apparatus 22. The "No. 1" in the second database shown in FIG. 3 is a record corresponding to a conference participant who operates the third terminal apparatus 23.

The conference functions include, for example, a change function, a document sharing function, and a conference participation function. For example, the change function is a function of changing usage function information. The change function is described while taking the first database shown in FIG. 2 as an example. The usage function information "entire usage permission" is set to a conference participant "family name: AAA" and "first name: Aaa" stored in the "No. 1" record. In this case, the conference participant "family name: AAA" and "first name: Aaa" is permitted to change the usage function information of a conference participant "family name: BBB" and "first name: Bbb" of the "No. 2" record, from partial usage permission to entire usage permission or limited permission.

For example, the document sharing function is a function of sharing a conference document. In the teleconference system 10, a teleconference is conducted in a state where a conference document is shared. In the first database, the usage function information "entire usage permission" is stored in the "No. 1" record, and the usage function information "partial usage permission" is stored in the "No. 2" record. In this case, the conference participant "family name: AAA" and "first name: Aaa" and the conference participant "family name: BBB" and "first name: Bbb" are permitted to upload document data from the terminal apparatus operated by him/herself to the conference server 30. The conference server 30 transfers the document data to the terminal apparatus operated by a conference participant of which the usage function information is "entire usage permission" or "partial usage permission". The conference server 30 may also transmit document data to the terminal apparatus that is the transmission source of the document data. On the other hand, the conference server 30 does not transfer document data to the third terminal apparatus 23 operated by the conference participant "family name: CCC" and "first name: Ccc" of which the usage function information is "limited permission".

The conference participation function is a basic function of teleconference. The conference participation function is described while taking the second database shown in FIG. 3 as an example. The conference participant "family name: CCC" and "first name: Ccc" can view video image and listen to sound of the conference participant "family name: AAA" and "first name: Aaa" who operates the first terminal apparatus 21, and can view video image and listen to sound of the conference participant "family name: BBB" and "first name: Bbb" who operates the second terminal apparatus 22. The conference participant "family name: CCC" and "first name: Ccc" is permitted to make an statement. That is, in the teleconference system 10, video data and audio data from the first terminal apparatus 21 and video data and audio data from the second terminal apparatus 22 are transferred from the conference server 30 to the third terminal apparatus 23. Video data and audio data shot and collected by the third terminal apparatus 23 are transferred from the conference server 30 to each of the first terminal apparatus 21 and the second terminal apparatus 22.

If usage permission is set, a conference participant can use all of the conference functions used in a teleconference or a plurality of functions excluding a certain function. In the embodiment, usage permission that all of the conference functions used in the teleconference can be used is referred to as "entire usage permission", and usage permission that a plurality of functions excluding a certain function can be used is referred to as "partial usage permission". If limited permission is set, the conference participant is further restricted from using part of the conference functions usable in partial usage permission. That is, a conference participant to which entire usage permission is set can use the change function, the document sharing function, and the conference participation function. A conference participant to which partial usage permission is set cannot use the change function, and can use the document sharing function and the conference participation function. A conference participant to which limited permission is set cannot use the change function and the document sharing function, and can use the conference participation function.

The teleconference system 10 may be operated in such a manner that limited permission is set to a conference participant who participates in a teleconference through a terminal apparatus connected to the external network 13, such as the third terminal apparatus 23 in the embodiment, out of conference participants (see FIG. 3). In the embodiment, it is assumed that the teleconference system 10 is operated in this way.

<Process Executed by Security Server>

The first login process and the usage function checking process executed by the security server 50 will be described.

<First Login Process>

The first login process will be described while referring to FIG. 4. The first login process is started when the communicator 54 receives a connection request that is transmitted from any terminal apparatus of the first terminal apparatus 21, the second terminal apparatus 22, and the third terminal apparatus 23. The connection request from the first terminal apparatus 21 includes an SSO login ID and an SSO password set for the conference participant "family name: AAA" and "first name: Aaa", and also includes address information of the first terminal apparatus 21. The connection request from the second terminal apparatus 22 includes an SSO login ID and an SSO password set for the conference participant "family name: BBB" and "first name: Bbb", and also includes address information of the second terminal apparatus 22. The connection request from the third terminal apparatus 23 includes address information of the third terminal apparatus 23.

The CPU 51 having started the first login process acquires a connection request through the communicator 54 (S11). The CPU 51 acquires address information from the acquired connection request (S13). The CPU 51 determines whether the acquired address information is included in a particular range (S15). The particular range is a range of local address corresponding to the second LAN 12 that is a subnet. For example, the particular range is set as IP address "192.168.0.1" to "192.168.0.254". The particular range is stored in a program of the first login process, for example. The CPU 51 may access the authentication server 40 and acquire the particular range from the authentication server 40, at the timing of S15.

If the address information acquired in S13 is within the particular range (S15: Yes), the CPU 51 controls transmission of the SSO login ID and the SSO password included in the connection request (S17). The transmission destination is set to the authentication server 40. The CPU 51 outputs a transmission command of the SSO login ID and the SSO password to the communicator 54. By this process, the SSO login ID and the SSO password are transmitted to the authentication server 40. The authentication server 40 performs authentication based on the SSO login ID and the SSO password from the security server 50. The authentication server 40 transmits an authentication result to the security server 50. The authentication result from the authentication server 40 is received by the communicator 54. The CPU 51 acquires the authentication result through the communicator 54 (S19). In an example of the embodiment, a connection request in a case where S15 is affirmed (S15: Yes) is transmitted from the first terminal apparatus 21 or the second terminal apparatus 22. The first terminal apparatus 21 and the second terminal apparatus 22 connected to the second LAN 12 are authenticated at the authentication server 40 at the time of startup, and single sign-on is realized. Accordingly, the authentication result acquired in S19 satisfies an authentication condition.

Next, the CPU 51 generates an SSO token corresponding to the SSO login ID and the SSO password (S21). Subsequently, the CPU 51 controls transmission of the SSO token (S23). The transmission destination is set to the conference management server 60. The CPU 51 outputs a transmission command of the SSO token to the communicator 54. By this process, the SSO token is transmitted to the conference management server 60.

If the address information acquired in S13 is not within the particular range (S15: No), the CPU 51 controls transmission of authentication screen data (S25). The transmission destination is set to the terminal apparatus that is the transmission source of the connection request. That is, in the example of the embodiment, the transmission destination is set to the third terminal apparatus 23. The CPU 51 outputs a transmission command of the authentication screen data to the communicator 54. By this process, the authentication screen data is transmitted to the third terminal apparatus 23 that is the transmission source of the connection request. At the third terminal apparatus 23, an authentication screen corresponding to the authentication screen data is displayed. As shown in FIG. 5, the authentication screen includes each input box of a conference login ID and a conference password and a login button. The conference participant ("family name: CCC" and "first name: Ccc"; see FIG. 3) who operates the third terminal apparatus 23 operates the operating unit (e.g., a mouse and/or a keyboard) of the third terminal apparatus 23 to input the conference login ID and the conference password. Subsequently, this conference participant operates the operating unit of the third terminal apparatus 23 to press the login button. In the third terminal apparatus 23, upon detecting pressing of the login button, the conference login ID and the conference password are received. The received conference login ID and conference password are transmitted to the security server 50.

In the security server 50, the conference login ID and the conference password from the third terminal apparatus 23 are received at the communicator 54. The CPU 51 acquires the conference login ID and the conference password through the communicator 54 (S27). Next, the CPU 51 controls transmission of the conference login ID and the conference password (S29). The transmission destination is set to the conference management server 60. The CPU 51 outputs a transmission command of the conference login ID and the conference password to the communicator 54. By this process, the conference login ID and the conference password are transmitted to the conference management server 60.

After executing S23 or S29, the CPU 51 acquires an authentication result through the communicator 54 (S31). The authentication result includes information indicative of the authentication result based on the SSO token of S23 or the conference login ID and the conference password of S29. The information indicative of the authentication result is login success or login error. The login success is information indicating that authentication based on the SSO token of S23 or the conference login ID and the conference password of S29 succeeds. The login error is information indicating that authentication based on the SSO token of S23 or the conference login ID and the conference password of S29 fails. The authentication result including login success includes session information. The authentication result not including login success includes login error and does not include session information. The session information is information for identifying a session established between a terminal apparatus that is the transmission source of the connection request and the conference server 30. For example, the above-described video data and audio data are transmitted and received between the terminal apparatus that is the transmission source of the connection request and the conference server 30, through the session identified by the session information. The authentication result is transmitted from the conference management server 60 in S75 or S77 of a second login process described later (see FIG. 7) and is received at the communicator 54. The second login process will be described later.

The CPU 51 determines whether the authentication result acquired in S31 includes login success (S33). If the authentication result includes login success (S33: Yes), the CPU 51 controls transmission of login completion notification (S35). The login completion notification is a notification corresponding to an authentication result including login success. The login completion notification includes session information included in the authentication result together with login success. The transmission destination is set to the terminal apparatus that is the transmission source of the connection request. The CPU 51 outputs a transmission command of the login completion notification to the communicator 54. By this process, the login completion notification is transmitted to the above-described terminal apparatus. In the terminal apparatus that has received the login completion notification, for example, a message screen corresponding to login success may be displayed based on the login completion notification.

If the authentication result acquired in S31 does not include login success (S33: No), the CPU 51 controls transmission of a login error notification (S37). The login error notification is a notification corresponding to an authentication result including login error. The transmission destination is set to the terminal apparatus that is the transmission source of the connection request. The CPU 51 outputs a transmission command of the login error notification to the communicator 54. By this process, the login error notification is transmitted to the above-described terminal apparatus. In the terminal apparatus that has received the login error notification, for example, a message screen corresponding to login error may be displayed based on the login error notification. After executing S35 or S37, the CPU 51 ends the first login process.

<Usage Function Checking Process>

A usage function checking process will be described while referring to FIG. 6. In the teleconference system 10, as described above, usage function information is stored for each conference participant (see FIGS. 2 and 3). Accordingly, in the terminal apparatus that has received the login completion notification transmitted in S35 of FIG. 4, after receiving this notification, a conference function that can be used in the terminal apparatus itself has to be identified. After receiving the login completion notification, the first terminal apparatus 21, the second terminal apparatus 22, and the third terminal apparatus 23 transmit a function checking request to the security server 50. The function checking request includes address information and session information. The address information is address information of the terminal apparatus that is the transmission source of the function checking request. The session information is session information included in the login completion notification transmitted in S35 of FIG. 4. The usage function checking process is started when the communicator 54 receives a function checking request transmitted from a terminal apparatus that has received the login completion notification, out of the first terminal apparatus 21, the second terminal apparatus 22, and the third terminal apparatus 23.

The CPU 51 having started the usage function checking process acquires the function checking request through the communicator 54 (S41). The CPU 51 acquires address information from the acquired function checking request (S43). The CPU 51 determines whether the acquired address information is included in the particular range (S45). The step S45 is a process similar to S15 of FIG. 4. The CPU 51 executes S45 in a similar manner to S15. If the function checking request is transmitted from the first terminal apparatus 21 or the second terminal apparatus 22, determination in S45 is affirmed (S45: Yes). If the function checking request is transmitted from the third terminal apparatus 23, determination in S45 is negated (S45: No). The other descriptions relating to S15 are omitted.

If the address information acquired in S43 is within the particular range (S45: Yes), the CPU 51 controls transmission of a function list request including SSO access information and session information (S47). The function list request is a command for requesting transmission of a list of conference functions that can be used by the terminal apparatus that has transmitted the function checking request. The SSO access information is information indicating that address information of the terminal apparatus having transmitted the function checking request is within the particular range. The session information is session information included in the function checking request acquired in S41. The transmission destination is set to the conference management server 60. The CPU 51 outputs, to the communicator 54, a transmission command of the function list request including the SSO access information and the session information. By this process, the function list request including the SSO access information and the session information is transmitted to the conference management server 60.

If the address information acquired in S43 is not within the particular range (S45: No), the CPU 51 controls transmission of a function list request including session information (S49). Similar to S47, the session information is session information included in the function checking request acquired in S41. The transmission destination is set to the conference management server 60. The CPU 51 outputs, to the communicator 54, a transmission command of the function list request including session information. By this process, the function list request including the session information is transmitted to the conference management server 60.

After executing S47 or S49, the CPU 51 acquires a function list through the communicator 54 (S51). The function list includes usage function information stored in the first database or the second database. That is, the function list acquired in S51 includes usage function information set for the terminal apparatus that is the transmission source of the function checking request. In addition, the function list includes session information. The session information included in the function list is identical to the session information included in the function list request transmitted in S47 or S49. This point will be described later. The function list is transmitted from the conference management server 60 in S87 or S91 of a function list transmitting process described later (see FIG. 8) and is received at the communicator 54. The function list transmitting process will be described later.

Next, the CPU 51 controls transmission of the function list acquired in S51 (S53). The transmission destination is set to the terminal apparatus that is the transmission source of the function checking request, and to the conference server 30. The CPU 51 outputs a transmission command of the function list to the communicator 54. By this process, the function list is transmitted to each of the above-described terminal apparatus and the conference server 30. The conference server 30 having received the function list including session information manages usage function information in association with session information. After executing S53, the CPU 51 ends the usage function checking process.

In the teleconference system 10, after the usage function checking process is finished for the first terminal apparatus 21, the second terminal apparatus 22, and the third terminal apparatus 23, a teleconference controlled by the conference server 30 and using the first terminal apparatus 21, the second terminal apparatus 22, and the third terminal apparatus 23 is started. The teleconference is conducted in accordance with a function list corresponding to each terminal apparatus. In S53 of the usage function checking process executed based on the function checking request from the first terminal apparatus 21, the function list is transmitted to the first terminal apparatus 21 and the conference server 30. In S53 of the usage function checking process executed based on the function checking request from the second terminal apparatus 22, the function list is transmitted to the second terminal apparatus 22 and the conference server 30. In S53 of the usage function checking process executed based on the function checking request from the third terminal apparatus 23, the function list is transmitted to the third terminal apparatus 23 and the conference server 30. For example, the conference server 30 controls transmission and reception of video data and audio data, in accordance with usage function information "entire usage permission", "partial usage permission", and "limited permission". The conference server 30 controls transmission and reception of document data, in accordance with usage function information "entire usage permission" and "partial usage permission". As described above, transmission and reception of data between the conference server 30 and each terminal apparatus of the first terminal apparatus 21, the second terminal apparatus 22, and the third terminal apparatus 23 are performed through sessions identified by session information.

<Process Executed by Conference Management Server>

A second login process and a function list transmitting process executed by the conference management server 60 will be described.

<Second Login Process>

The second login process will be described while referring to FIG. 7. The second login process is started when the communicator 64 receives authentication information transmitted from the security server 50 in the first login process shown in FIG. 4. The authentication information transmitted from the security server 50 is either the SSO token transmitted in S23 of FIG. 4 or the conference login ID and the conference password transmitted in S29 of FIG. 4. The CPU 61 having started the second login process acquires authentication information through the communicator 64 (S61). Next, the CPU 61 identifies a type of the acquired authentication information (S63). That is, the CPU 61 determines whether the acquired authentication information is the SSO token, or the conference login ID and the conference password. Although descriptions are omitted above, in S23 and S29 of FIG. 4, information indicative of the type of the authentication information is transmitted, together with the authentication information. That is, in S23 of FIG. 4, information indicating that the authentication information is an SSO token is transmitted, together with the SSO token. In S29 of FIG. 4, information indicating that the authentication information is a conference login ID and a conference password is transmitted, together with the conference login ID and the conference password. In S61, the CPU 61 acquires information indicative of the type of authentication information, together with the authentication information. In S63, the CPU 61 identifies the type of the acquired authentication information, based on the information indicative of the type of the authentication information.

Next, the CPU 61 determines whether the authentication information acquired in S61 is an SSO token (S65). If the authentication information is the SSO token (S65: Yes), the CPU 61 accesses the first database (S67). The CPU 61 determines whether the first database stores an SSO token that is identical to the SSO token acquired in S61 (S69). If the first database stores an SSO token that is identical to the SSO token acquired in S61 (S69: Yes), the CPU 61 moves the process to S75. If the first database does not store an SSO token that is identical to the SSO token acquired in S61 (S69: No), the CPU 61 moves the process to S77.

If the authentication information is not the SSO token (S65: No), the CPU 61 accesses the second database (S71). If S65 is negated (S65: No), the authentication information acquired in S61 is the conference login ID and the conference password transmitted in S29 of FIG. 4. The CPU 61 determines whether the second database stores a combination (record) of the conference login ID and the conference password that are identical to the conference login ID and the conference password acquired in S61 (S73). If the second database stores the above-described combination of the conference login ID and the conference password (S73: Yes), the CPU 61 moves the process to S75. If the second database does not store the above-described combination of the conference login ID and the conference password (S73: No), the CPU 61 moves the process to S77.

In S75, the CPU 61 controls transmission of the authentication result including login success. For this transmission, the CPU 61 generates session information. The CPU 61 adds the generated session information to the authentication result. That is, in S75, the CPU 61 controls transmission of the authentication result including login success and session information. The transmission destination is set to the security server 50. The CPU 61 outputs a transmission command of this authentication result to the communicator 64. By this process, the authentication result including each of the above-described information is transmitted to the security server 50.

Here, assume that the authentication information acquired in S61 is the SSO token (S65: Yes). In this case, the CPU 61 accesses the first database, and adds the generated session information to a record having an SSO token identical to the SSO token acquired in S61. By this process, the first database becomes a state in which usage function information and session information are stored in association with each other for each conference participant (see the lower table of FIG. 2). On the other hand, assume that the authentication information acquired in S61 is the conference login ID and the conference password (S65: No). In this case, the CPU 61 accesses the second database, and adds the generated session information to a record having a conference login ID and a conference password identical to the conference login ID and the conference password acquired in S61. By this process, the second database becomes a state in which usage function information and session information are stored in association with each other for each conference participant (see the lower table of FIG. 3).

In S77, the CPU 61 controls transmission of the authentication result including login error. The transmission destination is set to the security server 50. The CPU 61 outputs a transmission command of this authentication result to the communicator 64. By this process, the authentication result including login error is transmitted to the security server 50. After executing S75 or S77, the CPU 61 ends the second login process.

<Function List Transmitting Process>

A function list transmitting process will be described while referring to FIG. 8. The function list transmitting process is started when the communicator 64 receives a function list request transmitted from the security server 50 in S47 or S49 of the usage function checking process shown in FIG. 6. The CPU 61 having started the function list transmitting process acquires the function list request through the communicator 64 (S81). Next, the CPU 61 determines whether the acquired function list request includes SSO access information (S83). The function list request including the SSO access information is transmitted from the security server 50 in S47 of FIG. 6.

If the function list request acquired in S81 includes SSO access information (S83: Yes), the CPU 61 accesses the first database and acquires usage function information (S85). The usage function information to be acquired is usage function information that is associated with session information identical to the session information included in the function list request. In the example of the embodiment, the usage function information acquired in S85 is "entire usage permission" or "partial usage permission". For example, assume that the session information included in the function list request is "xxx111". In this case, the CPU 61 acquires usage function information "entire usage permission" that is associated with session information "xxx111" stored in the first database (see the lower table of FIG. 2). Assume that the session information included in the function list request is "yyy222". In this case, the CPU 61 acquires usage function information "partial usage permission" that is associated with session information "yyy222" stored in the first database (see the lower table of FIG. 2).

Subsequently, the CPU 61 controls transmission of a function list including usage function information and session information (S87). The usage function information is usage function information acquired in S85. The session information is session information included in the function list request acquired in S81. The transmission destination is set to the security server 50. The CPU 61 outputs a transmission command of this function list to the communicator 64. By this process, the function list including the usage function information "entire usage permission" or "partial usage permission" and the session information is transmitted to the security server 50.

If the function list request acquired in S81 does not include SSO access information (S83: No), the CPU 61 accesses the second database and acquires usage function information (S89). The usage function information to be acquired is usage function information that is associated with session information identical to the session information included in the function list request. In the example of the embodiment, the usage function information acquired in S89 is "limited permission". For example, assume that the session information included in the function list request is "zzz333". In this case, the CPU 61 acquires usage function information "limited permission" that is associated with session information "zzz333" stored in the second database (see the lower table of FIG. 3).

Subsequently, the CPU 61 controls transmission of a function list including usage function information and session information (S91). The usage function information is usage function information acquired in S89. The session information is session information included in the function list request acquired in S81. The transmission destination is set to the security server 50. The CPU 61 outputs a transmission command of this function list to the communicator 64. By this process, the function list including the usage function information "limited permission" and the session information is transmitted to the security server 50. After executing S87 or S91, the CPU 61 ends the function list transmitting process.

Effects of Embodiment

According to the above-described embodiment, the following effects can be obtained.

(1) In the security server 50, in the first login process (see FIG. 4), if the address information acquired from a connection request is within the particular range (see S15: Yes of FIG. 4), the SSO token corresponding to the SSO login ID and the SSO password for authentication at the authentication server 40 is transmitted to the conference management server 60 (see S23 of FIG. 4). If the address information is not within the particular range (see S15: No of FIG. 4), the conference login ID and the conference password are transmitted to the conference management server 60 (see S29 of FIG. 4).

In the conference management server 60, in the second login process (see FIG. 7), authentication is performed by using the SSO token, or the conference login ID and the conference password from the security server 50 (see S69 or S73 of FIG. 7), and the authentication result is transmitted to the security server 50 (see S75 or S77 of FIG. 7). In the security server 50, if the authentication result includes login success (see S33: Yes of FIG. 4), the login completion notification is transmitted (see S35 of FIG. 4). If the authentication result does not include login success (S33: No), the login error notification is transmitted (see S37 of FIG. 4). The transmission destination of the login completion notification or the login error notification is the terminal apparatus that is the transmission source of the connection request.

Hence, even with authentication information of different types, connection to the conference server 30 can be authenticated by the security server 50 and the conference management server 60. The type of the authentication information is determined based on relationship between the address information of the terminal apparatus and the particular range. The particular range serving as determination condition in S15 of FIG. 4 is a range of local address corresponding to the second LAN 12 that is a subnet to which the authentication server 40 is connected, so that determination can be made by using the second LAN 12 as the basis. The third terminal apparatus 23 can be differentiated from the first terminal apparatus 21 and the second terminal apparatus 22.

(2) In the security server 50, if the address information acquired from the connection request in S43 of the usage function checking process (see FIG. 6) is within the particular range (see S45: Yes of FIG. 6), the function list request including the SSO access information and the session information is transmitted to the conference management server 60 (see S47 of FIG. 6). If the address information is not within the particular range (see S45: No of FIG. 6), the function list request including the session information is transmitted to the conference management server 60 (see S49 of FIG. 6).

In the conference management server 60, in the function list transmitting process (see FIG. 8), the function list is transmitted to the security server 50 in response to the function list request from the security server 50 (see S87 or S91 of FIG. 8). If the function list request includes SSO access information (see S83: Yes of FIG. 8), the function list includes usage function information "entire usage permission" or "partial usage permission" that is associated, in the first database, with session information identical to the session information included in the function list request (see the lower table of FIG. 2 and S85 and S87 of FIG. 8). If the function list request does not include SSO access information (see S83: No of FIG. 8), the function list includes usage function information "limited permission" that is associated, in the second database, with session information identical to the session information included in the function list request (see the lower table of FIG. 3 and S89 and S91 of FIG. 8). In the security server 50, the function list from the conference management server 60 is transmitted to the terminal apparatus that is the transmission source of the function checking request and to the conference server 30.

Hence, in the conference management server 60, depending on the relationship between address information of the terminal apparatuses and the particular range, transmission of the usage function information "entire usage permission" or "partial usage permission" and transmission of the usage function information "limited permission" can be controlled. The usage function information "entire usage permission" or "partial usage permission" is not transmitted to the third terminal apparatus 23 connected to the external network 13. For example, regarding the document sharing function that is one of conference functions used in a teleconference, sharing of a conference document to the third terminal apparatus 23 can be restricted. A situation can be prevented in which document data corresponding to a conference document including a confidential matter is transmitted to the external network 13.

<Modifications>

While the disclosure has been described in detail with reference to the above aspects thereof, it would be apparent to those skilled in the art that various changes and modifications may be made therein without departing from the scope of the claims. In the following description, like parts and components are designated by the same reference numerals to avoid duplicating description.

(1) In the above-described example, in S15 of the first login process shown in FIG. 4, the range of address information corresponding to the second LAN 12 is set as the particular range, and the address information acquired from the connection request is compared with the particular range. In S15 of FIG. 4, it may be determined whether the address information of the terminal apparatus that is the transmission source of the connection request is within the particular range, based on whether the acquired connection request includes an SSO login ID and an SSO password as the first authentication information. That is, if the connection request includes the SSO login ID and the SSO password, the CPU 51 determines that the address information of the terminal apparatus that is the transmission source of the connection request is within the particular range (see S15: Yes of FIG. 4). If the connection request does not include the SSO login ID and the SSO password, the CPU 51 determines that the address information of the terminal apparatus that is the transmission source of the connection request is not within the particular range (see S15: No of FIG. 4).

(2) In the above-described example, in S15 of the first login process shown in FIG. 4, in order to determine whether address information included in the connection request is included in the particular range, it is determined whether the address information is included in the range of a local address corresponding to the second LAN 12. The address information may be other than IP address. For example, in a case where the connection request includes a physical address (for example, MAC address) of the terminal apparatus of the transmission source, it may be determined whether the address information is included in the particular range by determining whether a MAC address of the terminal apparatus of the transmission source is a particular MAC address. For example, the particular MAC address as the particular range corresponds to MAC addresses of the plurality of terminal apparatuses such as the first terminal apparatus 21 and the second terminal apparatus 22 connected to the second LAN 12. For example, the particular MAC address is included in the program of the first login process. The CPU 51 may access the authentication server 40 at the timing of S15, and may acquire the particular MAC address from the authentication server 40. If the MAC address of the terminal apparatus of the transmission source is the particular MAC address, the CPU 51 determines that the address information of the terminal apparatus that is the transmission source of the connection request is within the particular range (see S15: Yes of FIG. 4). If the MAC address of the terminal apparatus of the transmission source is not the particular MAC address, the CPU 51 determines that the address information of the terminal apparatus that is the transmission source of the connection request is not within the particular range (see S15: No of FIG. 4).

(3) In the above-described example, in the usage function checking process shown in FIG. 6, it is determined whether the address information acquired from the function checking request is within the particular range (see S45 of FIG. 6). And, if the address information is within the particular range (see S45: Yes of FIG. 6), the function list request including SSO access information is transmitted to the conference management server 60 (see S47 of FIG. 6). In the function list transmitting process shown in FIG. 8, the database to access is determined depending on whether SSO access information exists in the function list request (see S83 of FIG. 8). Determination of whether the address information of the terminal apparatus of the transmission source of the function checking request is within the particular range may be performed in the function list transmitting process. In this case, in the usage function checking process, the processes of S45 to S49 are omitted. The address information acquired in S43 and the session information are included in the function list request transmitted to the conference management server 60. The SSO access information is omitted. In the conference management server 60, the particular range similar to that described above is included in the program of the function list transmitting process. In the function list transmitting process, address information is acquired from the function list request acquired in S81. Next, in the function list transmitting process, determination similar to S45 of FIG. 6 is performed based on this address information, and the process moves to S85 or S89 depending on the determination result.

(4) In the above-described example, in the usage function checking process shown in FIG. 6, if the address information acquired from the function checking request is within the particular range (see S45: Yes of FIG. 6), the function list request including the SSO access information and the session information is transmitted to the conference management server 60 (see S47 of FIG. 6). In the function list transmitting process shown in FIG. 8, the database to access is determined depending on whether SSO access information exists in the function list request (see S83 of FIG. 8). In the function list request, the SSO access information may be omitted. In this case, in the usage function checking process, in response to acquisition of the function checking request (see S41 of FIG. 7), the function list request including the session information included in the function checking request is transmitted to the conference management server 60. In the function list transmitting process, in a similar manner to the above, the function list request is acquired in S81. Next, in the function list transmitting process, a search is performed for a record having session information identical to the session information included in the acquired function list request, among records stored in the first database and records stored in the second database, and the above-described record is identified. Subsequently, in the function list transmitting process, the function list including the usage function information stored in the identified record is transmitted to the security server 50. In the usage function checking process, in a similar manner to the above, the function list from the conference management server 60 is acquired in S51, and S53 is executed.

(5) In the above-described example, in S23 and S29 of the first login process shown in FIG. 4, information indicative of the type of authentication information is transmitted together with the authentication information. And, in S63 of the second login process shown in FIG. 7, the type of the authentication information acquired in S61 is determined based on the information indicative of the type of the authentication information. Determination of the type of the authentication information in S63 may be performed as follows. For example, the type of the authentication information may be determined based on whether the authentication information includes a password. If the authentication information includes a password, the password included in the authentication information is a conference password. Accordingly, as the authentication information acquired in S61, the conference login ID and the conference password is identified. On the other hand, if the authentication information does not include a password, as the authentication information acquired in S61, the SSO token is identified. Or, the type of the authentication information may be determined based on whether a data length of the authentication information acquired in S61 is longer than or equal to a particular reference value. In this case, the data length of the SSO token is longer than or equal to the reference value. The data length of the conference login ID and the conference password is set to be shorter than the reference value. If the data length of the authentication information is longer than or equal to the reference value, the SSO token is identified as the authentication information acquired in S61. If the data length of the authentication information is shorter than the reference value, the conference login ID and the conference password are identified as the authentication information acquired in S61.

(6) In the above-described example, the "limited permission" is set for the conference participant who participates in a teleconference through the terminal apparatus connected to the external network 13, such as the third terminal apparatus 23. For example, the usage permission information "partial usage permission" may be set for the conference participant who participates in the teleconference through the terminal apparatus connected to the external network 13, as the initial value or by a change function admitted in the "entire usage permission".

It is assumed that, for the conference participant who participates in a teleconference through the terminal apparatus connected to the external network 13 such as the third terminal apparatus 23, only the "limited permission" is set as in the above-described example. In this case, in the function list transmitting process shown in FIG. 8, when determination in S83 is negated (see S83: No of FIG. 8), the function list including the usage function information "limited permission" may be transmitted to the security server 50 immediately. In this case, S89 is omitted and, if determination in S83 is negated (see S83: No of FIG. 8), S91 is executed.

What is claimed is:

1. A teleconference system comprising a security server and a conference management server physically separated from each other, the teleconference system being configured to perform a teleconference through a network,
the security server comprising:
a first communicator configured to connect to the network;
a first hardware processor; and
a first memory storing instructions, the instructions, when executed by the first hardware processor, causing the first hardware processor to perform:
a selecting operation of selecting an authentication sequence from a first sequence using a single sign-on authentication and a second sequence not using the single sign-on authentication, the selecting operation selecting the first sequence as the authentication sequence when address information of a terminal apparatus operated by a conference participant is included in a particular range, and the selecting operation selecting the second sequence when the address information of the terminal apparatus is outside the particular range; and
executing the selected authentication sequence,
wherein the first sequence includes:
transmitting first authentication information corresponding to the conference participant from the first communicator to an authentication server physically separated from the security server and the conference management server, the first authentication information being acquired from the terminal apparatus through the first communicator, the authentication server being configured to authenticate usage of a function through a network corresponding to the particular range;
generating, when an authentication result satisfying an authentication condition is acquired through the first communicator from the authentication server in response to transmission of the first authentication information, second authentication information corresponding to the first authentication information;
transmitting the second authentication information from the first communicator to the conference management server, the conference management server being configured to authenticate connection to a conference server configured to control the teleconference,
transmitting a first authentication result from the first communicator to the terminal apparatus that is a transmission source of the first authentication information, the first authentication result being acquired from the conference management server through the first communicator in response to transmission of the second authentication information, and wherein the second sequence includes:
transmitting third authentication information corresponding to the conference participant from the first communicator to the conference management server, the third authentication information being acquired from the terminal apparatus through the first communicator; and transmitting a second authentication result from the first communicator to the terminal apparatus that is a transmission source of the third authentication information, the second authentication result being acquired from the conference management server through the first communicator in response to transmission of the third authentication information, the conference management server comprising:
a second communicator configured to connect to the network;
a second hardware processor; and
a second memory storing instructions, the instructions, when executed by the second hardware processor, causing the second hardware processor to perform:
an authenticating operation of:
when the third authentication information is acquired from the security server through the second communicator, authenticating connection to the conference server based on authentication information stored in a management portion of the conference management server and on the third authentication information; and
when the second authentication information is acquired from the security server through the second communicator, authenticating connection to the conference server based on authentication information stored in the management portion and on the second authentication information; and
an authentication result transmitting operation of transmitting an authentication result by the authenticating operation from the second communicator to the security server.

2. The teleconference system according to claim 1, wherein the security server is connected to a local area network to which the authentication server is connected; and
wherein the conference management server is connected to an external network different from the local area network.

3. The teleconference system according to claim 2, wherein the local area network is formed by a first local area network and a second local area network different from the first local area network; and
wherein the security server is connected to the first local area network, and the authentication server is connected to the second local area network.

4. The teleconference system according to claim 3, wherein the particular range of the address information corresponds to a range of local address in the second local area network.

5. The teleconference system according to claim 1, wherein the management portion of the conference management server includes a first database storing authentication information for being compared with the second authentication information, and a second database storing authentication information for being compared with the third authentication information;
wherein the first database stores usage function information indicative of usage permission of a particular conference function that is given to the terminal apparatus of which the address information is included in the particular range; and
wherein the second database stores usage function information indicative of limited permission of a conference function excluding the particular conference function.

6. A non-transitory computer-readable storage medium storing a program executable by a computer configured to control a security server included in a teleconference system in which a teleconference is conducted through a network, the program comprising:
a selecting instruction of selecting an authentication sequence from a first sequence using a single sign-on authentication and a second sequence not using the single sign-on authentication, the selecting instruction selecting the first sequence as the authentication sequence when address information of a terminal apparatus operated by a conference participant is included in a particular range, and the selecting instruction selecting the second sequence when the address information of the terminal apparatus is outside the particular range; and
an execution instruction of executing the selected authentication sequence,
wherein the first sequence includes:
transmitting first authentication information corresponding to the conference participant from a communicator of the security server to an authentication server physically separated from the security server, the first authentication information being acquired from the terminal apparatus through the communicator, the authentication server being configured to authenticate usage of a function through a network corresponding to the particular range;
generating, when an authentication result satisfying an authentication condition is acquired through the communicator from the authentication server in response to transmission of the first authentication information, second authentication information corresponding to the first authentication information;
transmitting the second authentication information from the communicator to a conference management server, physically separated from the security server and the authentication server, the conference management server being configured to authenticate connection to a conference server configured to control the teleconference; and
transmitting a first authentication result from the communicator to the terminal apparatus that is a transmission source of the first authentication information, the first authentication result being acquired from the conference management server through the communicator in response to transmission of the second authentication information, and
wherein the second sequence includes:
transmitting third authentication information corresponding to the conference participant from the communicator to the conference management server, the third authentication information being acquired from the terminal apparatus through the communicator; and transmitting a second authentication result from the communicator to the terminal apparatus that is a transmission source of the third authentication information, the second authentication result being acquired from the conference management server through the communicator in response to transmission of the third authentication information.

7. The non-transitory computer-readable storage medium according to claim 6, wherein whether the address information of the terminal apparatus is included in the particular range is based on whether the address information of the terminal apparatus is in a same subnet as a network to which the authentication server is connected.

8. The non-transitory computer-readable storage medium according to claim 7, wherein the transmitting the third authentication information in the second sequence comprises transmitting the third authentication information from the communicator to the conference management server, the conference management server being connected to an external network different from a local area network including the subnet to which the authentication server is connected.

9. The non-transitory computer-readable storage medium according to claim 6, wherein the program further comprises a fourth transmitting instruction of, when the address information of the terminal apparatus is included in the particular range, transmitting access information from the communicator to the conference management server, the access information indicating that the address information of the terminal apparatus is included in the particular range.

10. The teleconference system according to claim 3, wherein the first local area network is connected to the external network; and wherein the second local area network is connected to the first local area network through a firewall.

11. The teleconference system according to claim 1, wherein the first memory further stores instructions, the instructions, when executed by the first hardware processor, causing the first hardware processor to perform:

acquiring a function checking request through the first communicator from the terminal apparatus that has received a login completion notification;

transmitting a function list request including session information to the conference management server, the function list request being a command for requesting transmission of a list of conference functions usable by the terminal apparatus that has transmitted the function checking request, the session information being information for identifying a session established between the conference server and the terminal apparatus that is a transmission source of a connection request to the teleconference;

acquiring a function list through the first communicator from the conference management server, the function list including usage function information set for the terminal apparatus that is a transmission source of the function checking request, the function list including the session information; and transmitting the acquired function list through the first communicator to the terminal apparatus that is the transmission source of the function checking request and to the conference server, such that the conference server having received the function list including the session information manages the usage function information in association with the session information.

* * * * *